(12) United States Patent
Iseno (10) Patent No.: US 10,674,089 B2
(45) Date of Patent: Jun. 2, 2020

(54) IMAGE PICKUP APPARATUS (71) Applicant: CANON KABUSHIKI KAISHA, Tokyo (JP)

(72) Inventor: Toshiya Iseno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/962,016

(22) Filed: Apr. 25, 2018

(65) Prior Publication Data
US 2018/0316863 A1 Nov. 1, 2018

(30) Foreign Application Priority Data

Apr. 27, 2017 (JP) ................................. 2017-088949

(51) Int. Cl.
*H04N 5/232* (2006.01)
(52) U.S. Cl.
CPC ..... *H04N 5/23267* (2013.01); *H04N 5/23258* (2013.01); *H04N 5/2328* (2013.01)
(58) Field of Classification Search
CPC ........... H04N 5/23267; H04N 5/23258; H04N 5/2328
See application file for complete search history.

(56) References Cited

U.S. PATENT DOCUMENTS

| | | | | |
|---|---|---|---|---|
| 6,466,253 B1* | 10/2002 | Honjoh | ................. | H04N 5/217 348/169 |
| 2006/0056829 A1* | 3/2006 | Hirota | ..................... | G03B 5/00 396/54 |
| 2006/0132615 A1* | 6/2006 | Imai | ..................... | H04N 1/2137 348/208.99 |
| 2009/0320593 A1* | 12/2009 | Nakashio | ........... | G01C 19/5663 73/504.15 |
| 2015/0042828 A1* | 2/2015 | Wakamatsu | ....... | H04N 5/23254 348/208.4 |
| 2016/0072998 A1* | 3/2016 | Yazawa | ................ | H04N 5/2328 348/208.7 |
| 2018/0103205 A1* | 4/2018 | Kikuchi | ............... | H04N 5/2251 |

FOREIGN PATENT DOCUMENTS

| | | |
|---|---|---|
| JP | 2006-317848 A | 11/2006 |
| JP | 2008-089995 A | 4/2008 |

* cited by examiner

*Primary Examiner* — Timothy J Henn
(74) *Attorney, Agent, or Firm* — Cowan, Liebowitz & Latman, P.C.

(57) ABSTRACT

An image pickup apparatus includes an image sensor, a grip that projects toward an object side in an optical axis direction in the imaging optical system, a rear exterior member located opposite to the object side, a driver configured to drive in the image pickup apparatus, a first holder configured to hold the driver, a first substrate including a control element configured to control the image pickup apparatus, an angular velocity detector configured to detect an angular velocity of the vibration, and a second holder configured to hold the angular velocity detector, on a side opposite to the grip with respect to an optical axis in the imaging optical system viewed from the optical axis direction and on the object side with respect to a space formed between the first substrate and the rear exterior member in the optical axis direction.

6 Claims, 8 Drawing Sheets

FIG. 8B ional vibrations, such as manual vibrations. The angular velocity sensor is, for example, a gyro sensor that periodically detects an angular velocity representing a moving amount of the camera, converts the angular velocity into an electric signal, and transmits the electric signal to a camera microcomputer. Japanese Patent Laid-Open No. ("JP") 2008-089995 detects vibrations of an imaging lens unit through an angular velocity sensor disposed on a plane approximately parallel to an optical axis in the imaging lens unit, and corrects an object image blur.

IMAGE PICKUP APPARATUS

BACKGROUND OF THE INVENTION

Field of the Invention

The present invention relates to an image pickup apparatus.

Description of the Related Art

A conventionally known method provides an angular velocity sensor to a camera and an imaging lens unit and detects vibrations of the camera body and the imaging lens, such as manual vibrations. The angular velocity sensor is, for example, a gyro sensor that periodically detects an angular velocity representing a moving amount of the camera, converts the angular velocity into an electric signal, and transmits the electric signal to a camera microcomputer. Japanese Patent Laid-Open No. ("JP") 2008-089995 detects vibrations of an imaging lens unit through an angular velocity sensor disposed on a plane approximately parallel to an optical axis in the imaging lens unit, and corrects an object image blur.

The follow shot imaging is known as one imaging method. This is an imaging technology that expresses a speed sense of a moving object, and attempts to make still the moving object and to allow the background to stream by panning the camera. In the follow short imaging, the photographer needs to pan the camera along the moving object but a difference between the moving object speed and the panning speed may blur an object image. As a solution for this problem, a proposed technology that assists the follow short imaging is a method that absorbs the difference between the moving object speed and the panning speed by moving a shift lens that corrects the manual vibration. JP 2006-317848 discloses an image pickup apparatus that provides a correction so as to dispose the object at the image center by moving the optical axis shift lens based on a movement of an apparatus body detected through an angular velocity sensor and a correction amount detected based on a moving vector in an image.

The angular velocity sensor is an element that may change an output as the temperature changes, and may not normally detect the vibration when disposed near the temperature changing position due to the heat of the element and the temperature of the photographer, such as near the camera microcomputer and at the grip. However, each of JP 2008-089995 and JP 2006-317848 is silent about a positional relationship between the angular velocity sensor and the position at which the temperature is likely to change in the apparatus.

In addition, according to JP 2008-089995 and JP 2006-317848, the angular velocity sensor is subject to the vibrations of units in the apparatus, such as a motor configured to drive a shutter unit and a power source configured to drive lenses, and may not correctly detect vibrations.

SUMMARY OF THE INVENTION

The present invention provides an image pickup apparatus that is less subject to influences of a temperature change and a vibration and can accurately detect a vibration.

An image pickup apparatus according to one aspect of the present invention includes an image sensor configured to capture an object image formed by an imaging optical system, a grip configured to project toward an object side in an optical axis direction in the imaging optical system, a rear exterior member located opposite to the object side, a driver configured to drive in the image pickup apparatus and including a shutter unit that can adjust an exposure time of the image sensor, a first holder configured to hold the driver, a first substrate including a control element configured to control the image pickup apparatus, an angular velocity detector configured to detect an angular velocity of a vibration in the image pickup apparatus, and a second holder spaced from the first holder and configured to hold the angular velocity detector, on a side opposite to the grip with respect to an optical axis in the imaging optical system viewed from the optical axis direction and on the object side of a space formed between the first substrate and the rear exterior member in the optical axis direction.

An image pickup apparatus according to another aspect of the present invention includes an image sensor configured to capture an object image formed by an imaging optical system, a grip configured to project toward an object side in an optical axis direction in the imaging optical system, a rear exterior member located opposite to the object side, a driver configured to drive in the image pickup apparatus and including a mirror unit configured to reflect the object image toward a finder optical system configured to enable a photographer to observe the object image, a first holder configured to hold the driver and the finder optical system, a first substrate including a control element configured to control the image pickup apparatus, an angular velocity detector configured to detect an angular velocity of a vibration in the image pickup apparatus, and a second holder spaced from the first holder and configured to hold the angular velocity detector, on a side opposite to the grip with respect to an optical axis in the imaging optical system viewed from the optical axis direction and on the object side of a space formed between the first substrate and the rear exterior member in the optical axis direction.

Further features of the present invention will become apparent from the following description of exemplary embodiments with reference to the attached drawings.

DESCRIPTION OF THE EMBODIMENTS

Referring now to the accompanying drawings, a detailed description will be given of an embodiment according to the present invention. The following embodiment does not intend to limit the present invention specified in claims and a combination of characteristics described in this embodiment is not indispensable to a solution for the problem(s) to be solved by the present invention.

Figure 1A:
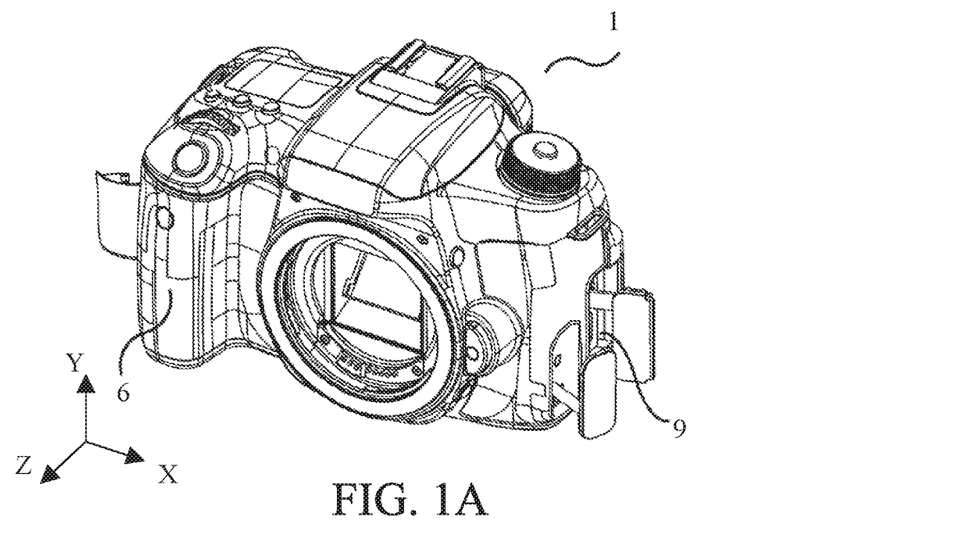
FIGS. 1A and 1B are perspective overviews of a camera body as an illustrative image pickup apparatus according to the present invention.
Figure 1B:
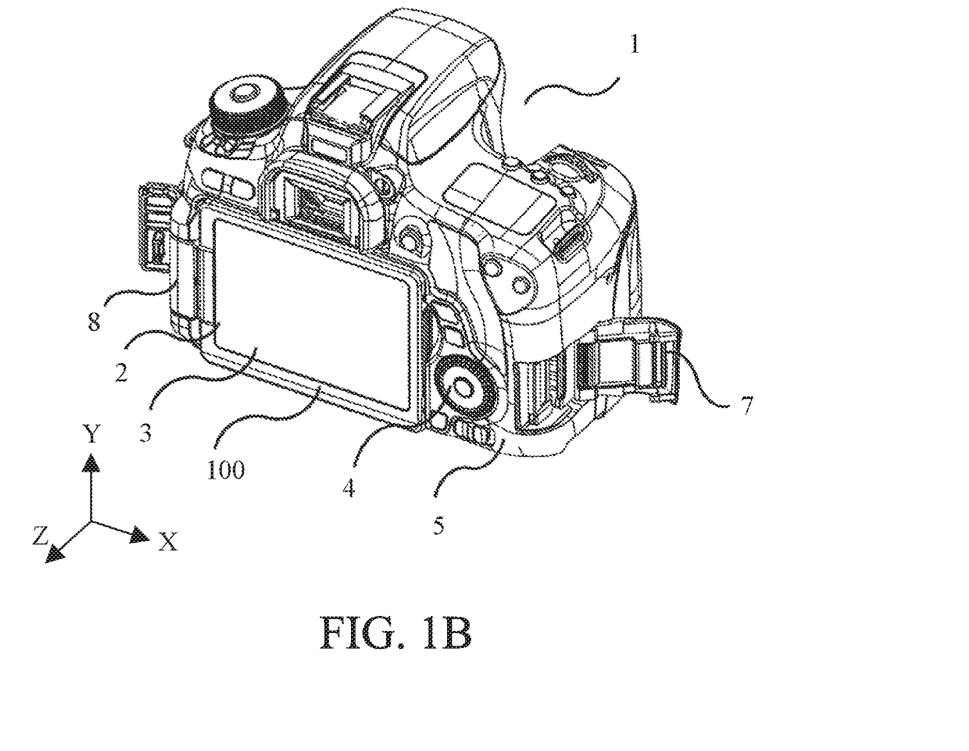
Figure 2:
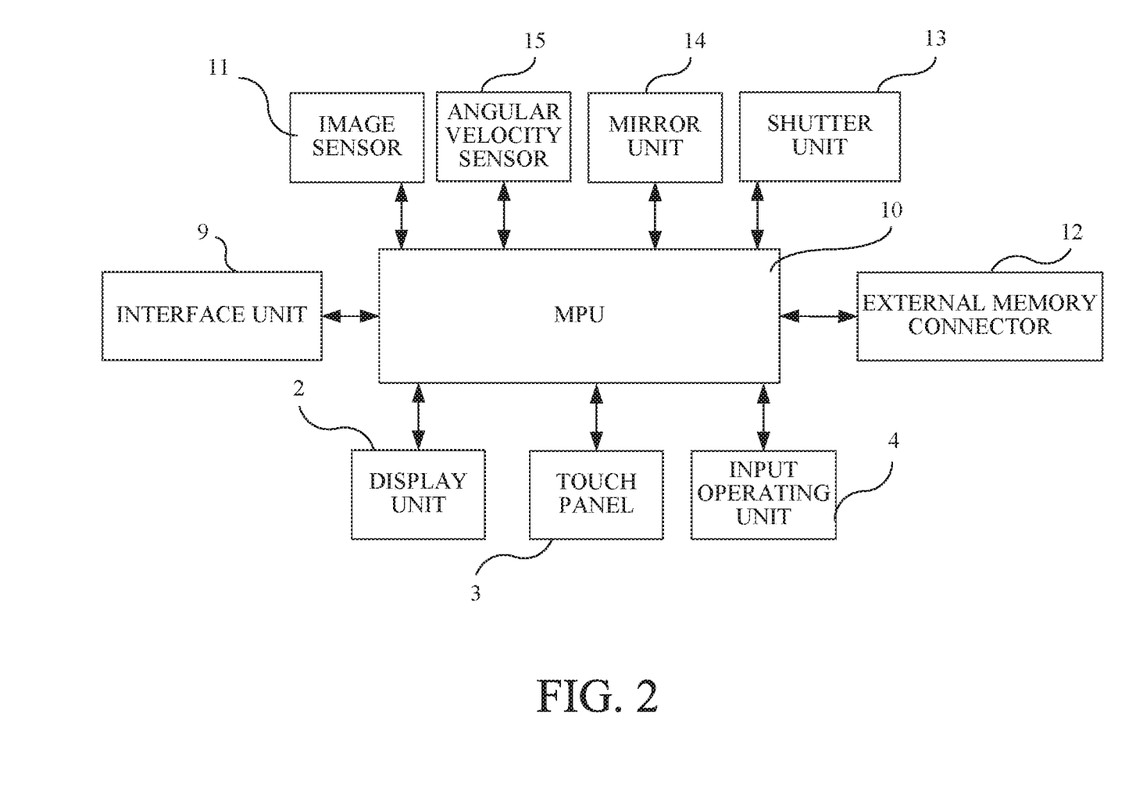
FIG. 2 is a block diagram of the camera body.

Referring now to FIGS. 1A, 1B, and 2, a description will be given of a structure of the camera body 1 as the illustrative image capturing apparatus according to the embodiment of the present invention. FIGS. 1A and 1B are perspective overviews of the camera body 1. FIG. 1A illustrates the camera body 1 viewed from the front side (object side), and FIG. 1B illustrates the camera body 1 viewed from the rear side (photographer side). FIG. 2 is a block diagram illustrating a main structure of the camera body 1.

The camera body 1 is a digital camera including an image sensor 11 configured to capture an object image formed by the imaging optical system. A vari-angle unit 100 is provided on the rear surface of the camera body 1. The vari-angle unit 100 includes a display unit 2 configured to display an image obtained by the image sensor 11, a variety of setting screens, etc. This embodiment uses a liquid crystal display apparatus for the display unit 2. The display unit 2 includes a touch panel 3 that enables a touch input operation by the photographer to switch displays on the display unit 2, to provide a release, and to change a variety of settings of the camera body 1. An input operating unit 4 is an operating member operated by the photographer, and enables the operation by the photographer to change a variety of settings in the camera body 1 and to power on and off the camera body 1. A rear exterior cover (rear exterior member) 5 is an exterior part of the camera body 1, and has a concave shape for housing the vari-angle unit 100.

A grip 6 is provided on the side of the camera body 1 so as to enable the photographer to hold the camera body 1 through the grip 6, and has a convex shape that facilitates gripping by the photographer. In this embodiment, the grip 6 is provided on the right side of the camera body 1 viewed from the rear side. In the following description, the right side of the camera body 1 viewed from the rear side (photographer side) or the grip side on which the grip 6 is provided will be referred to as a grip side, and the left side of the camera body 1 viewed from the rear side (photographer side) or the side opposite to the side of the grip 6 will be referred to as a counter-grip side. The grip 6 is a location to be gripped by the photographer, and is likely to change the temperature due to the temperature of the photographer. In other words, the grip 6 is a position that may cause temperature changes. A media door 7 is provided to the grip 6 so that the media door 7 opens and closes so that an external memory for storing an image, such as a CF card and an SD card, can be inserted into and ejected from the external memory 12. An interface unit 9 is connected to a USB cable and an external apparatus. In this embodiment, the interface unit 9 is provided on the counter-grip side so that the photographer can connect the external apparatus while gripping the camera body 1.

A microcomputer 10 (control element or MPU 10 hereinafter) 10, processes an image signal acquired by the image sensor 11, and displays the processed image signal on the display unit 2. The MPU 10 controls the camera operation and the external apparatus based on an input signal received from the external apparatus connected to the touch panel 3, the input operating unit 4, or the interface unit 9. For example, when detecting the release operation, the MPU 10 retreats the mirror unit 14 to a predetermined position, then drives (unillustrated) shutter blades in the shutter unit 13, makes the image sensor 11 expose the image pickup light flux, and obtains the image signal. In addition, the MPU 10 records image data in the external memory connected to the external memory connector 12.

The angular velocity sensor (angular velocity detector) 15 can detect angular changes (vibrations or blurs) per a predetermined time of the camera body 1. The MPU 10 controls an imaging condition, such as a shutter speed in follow shot imaging, based on a signal value output from the angular sensor 15.

The vari-angle unit 100 is supported rotatably relative to the camera body 1 via a hinge mechanism 8. The hinge mechanism 8 is provided on the counter-grip side so that the photographer can rotate the vari-angle unit 100 while gripping the camera body 1.

Figure 3A:
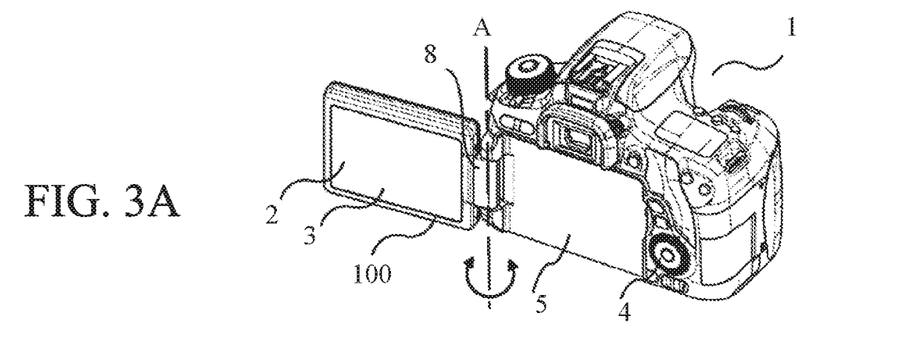
FIGS. 3A, 3B, and 3C illustrate a rotating operation of a vari-angle unit.
Figure 3B:
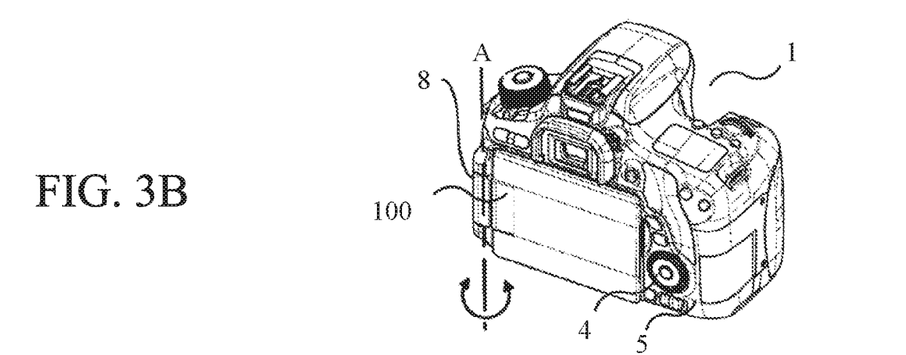
Figure 3C:
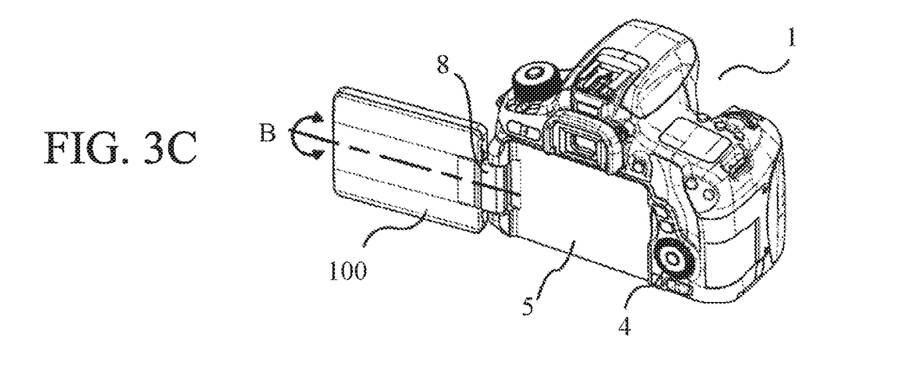

Referring now to FIG. 3, a description will be given of the rotating operation of the vari-angle unit 100. FIG. 3 is an explanatory view of the rotation of the vari-angle unit 100.

The hinge mechanism 8 includes a two-axis hinge mechanism with a first rotating axis A and a second rotating axis B. The vari-angle unit 100 can close and open relative to the camera body 1 around the first rotating axis A. In the opening and closing operation, the vari-angle unit 100 rotates around the first rotating axis A between a state illustrated in FIG. 3A in which the display unit 2 faces the photographer side and a state illustrated in FIG. 3B in which the display unit 2 faces the camera body 1 side and is housed in the rear exterior cover 5.

The vari-angle unit 100 rotates around the second rotating axis B. In the rotating operation, the vari-angle unit 100 rotates around the second rotating axis B between a state illustrated in FIG. 3A in which the display unit 2 faces the photographer side and a state illustrated in FIG. 3C in which the display 2 faces the camera body 1 side.

Figure 4A:
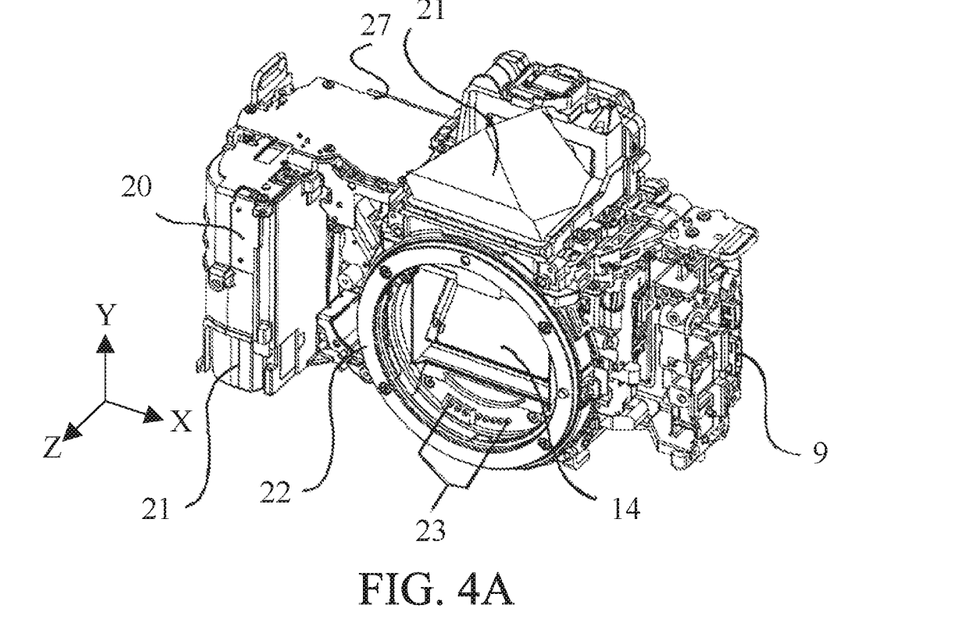
FIGS. 4A and 4B are perspective views of an internal structure of the camera body.
Figure 4B:
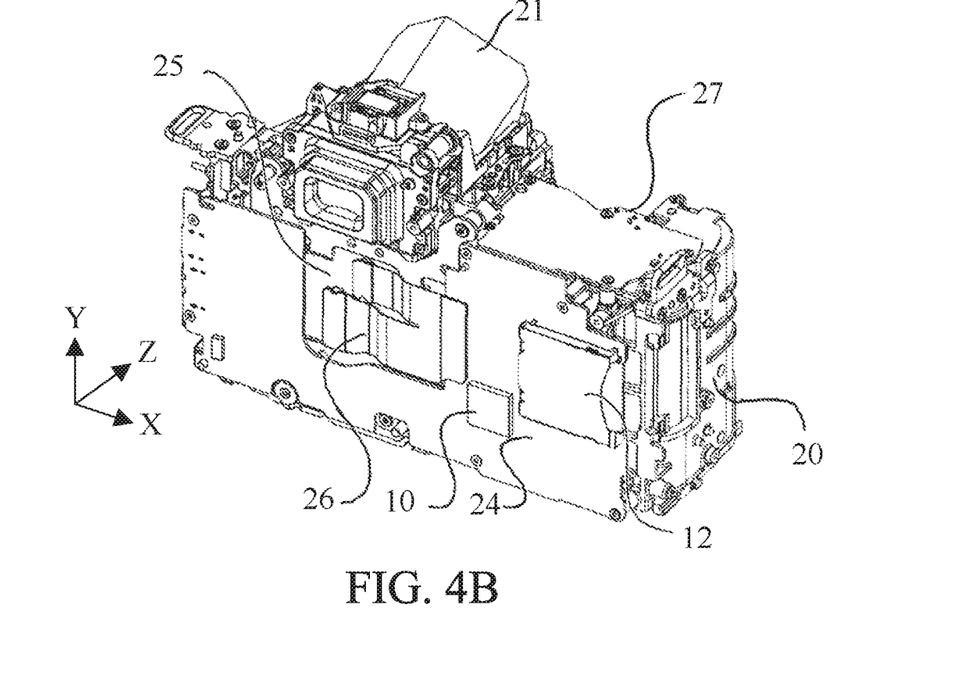
Figure 5:
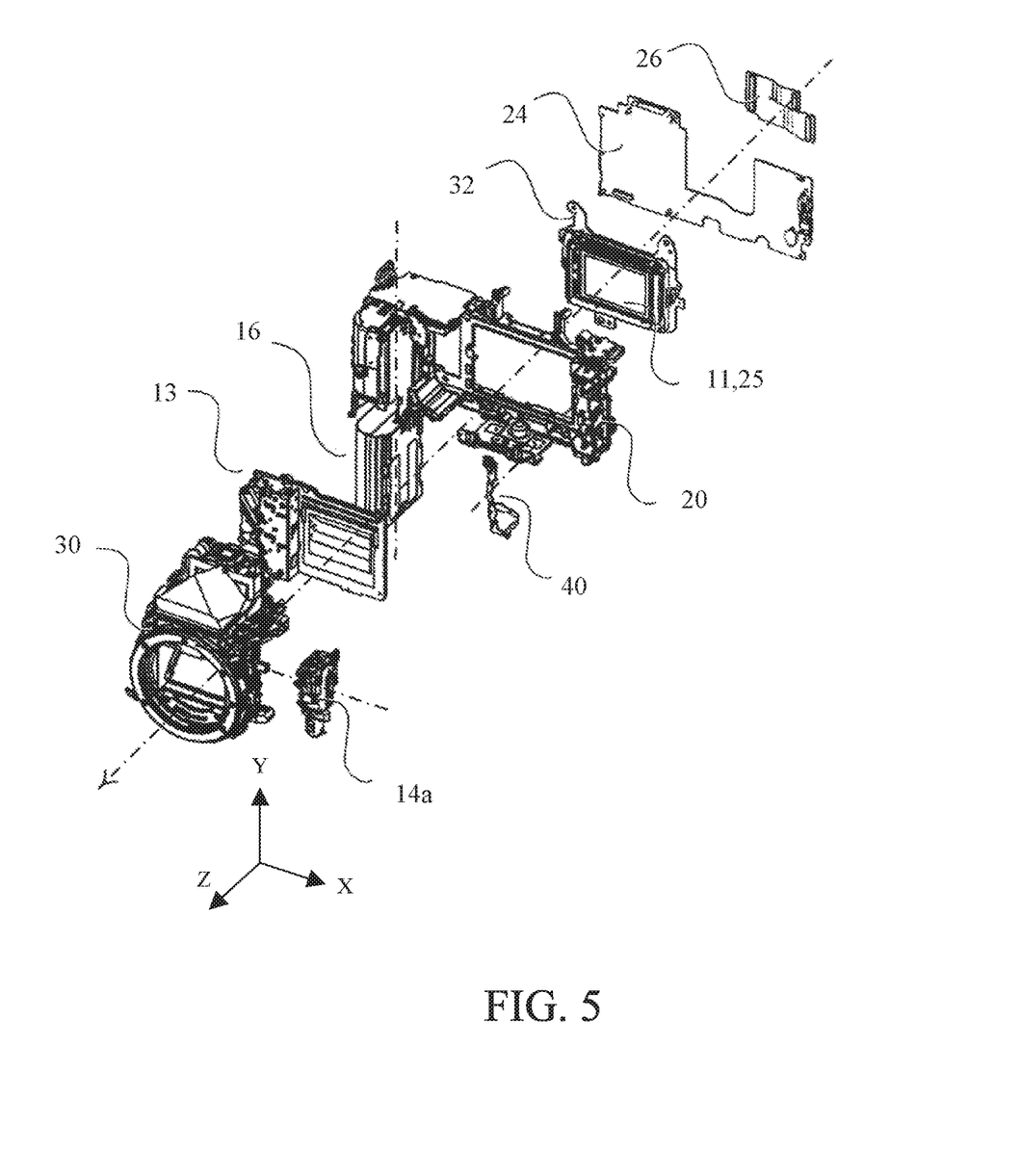
FIG. 5 is an exploded perspective view of the internal structure of the camera body.

Next follows a description of the internal structure of the camera body 1 (configuration of the state from which the exterior member is detached). FIGS. 4A and 4B are perspective views of the internal structure of the camera body 1. FIG. 4A illustrates the camera body 1 viewed from the front side, and FIG. 4B illustrates the camera body 1 viewed from the rear side. FIG. 5 is an exploded perspective view of the internal structure of the camera body 1.

A main base (second holder) 20 is a framework of the camera body 1, made of resin etc. The photographer can observe an object image reflected on the mirror unit 14 via the penta prism (finder optical system) 21.

A mount 22 is a metal ring used to attach the imaging lens (imaging optical system) and made of a metal material, such as stainless steel). When an unillustrated lens ejection button is operated, the imaging lens is attached removably to the mount 22. A communication between the imaging lens and the camera body 1 and the power supply for driving the imaging lens are performed by a plurality of communication pins 23.

A control substrate (first substrate) 24 is fixed onto the main base 20, and electrically connected to an imaging substrate 25 via an imaging flexible substrate 26. Each of the control substrate 24 and the imaging substrate 25 is a printed wired board ("PWB"). The control substrate 24 is disposed on a rear side (photographer side) of the main base 20 in an optical axis direction in the imaging lens.

The control substrate 24 has an approximately U-shape, and is mounted with many electric circuits such as the MPU 10. The MPU 10 controls a camera operation, and receives and communicates many signals. Hence, the MPU 10 may be disposed on a wide substrate area, and is located on the grip side having the grip 6 so as to secure the substrate area. The MPU 10 emits the heat in the data processing, and becomes hot in processing enormous data, such as motion imaging and live-view imaging. Due to the heat of the MPU 10, the entire control substrate 24 becomes hot. In other words, the entire control substrate 24 is likely to change the temperature. The space between the control substrate 24 and the rear external cover 5 is likely to change the temperature due to the heat from the MPU 10 and the contact area change between the rear exterior cover 5 and the external atmosphere (a heat amount change to the external atmosphere) as the vari-angle unit 100 opens and closes.

Since the MPU 10 transmits an image signal to the external memory connected to the external memory connector 12, the MPU 10 may be disposed near the memory connector 12 (on the grip side) based on noise influences on the image signal.

The image sensor 11 is mounted on the imaging substrate 25. The image sensor 11 emits the heat in the operation but becomes hot, in particular, in processing enormous data, such as motion imaging and live-view imaging. Hence, the temperature near the image sensor 11 rises due to the heat of the image sensor 11. In other words, the temperature at and near the image sensor 11 is likely to change.

The power substrate 27 receives the power from the battery 16, and generates the power supplied to the substrate and the units so as to drive the electric circuits. The battery 16 is disposed in the convex shape in the grip 6 for space saving of the camera body 1. Hence, the power substrate 27 and the battery 16 are arranged on the grip side.

A front unit (first holder) 30 is made of a material, such as resin, and a driver that can be driven in the camera body 1 is attached to the front unit 30. The attached driver contains a shutter unit 13 configured to adjust the exposure time of the image sensor 11 and a mirror driving unit 14a that is part of a mirror unit 14 in this embodiment. The front unit 30 is fixed onto the main base 20 by unillustrated screws. A plate 32 is attached to the front unit 30. A plate 32 is made of a metallic material, such as stainless steel, and holds the imaging substrate 25.

The angular velocity flexible substrate 40 (second substrate) is mounted with the angular velocity sensor 15, and fixed onto the main base 20.

Figure 6A:
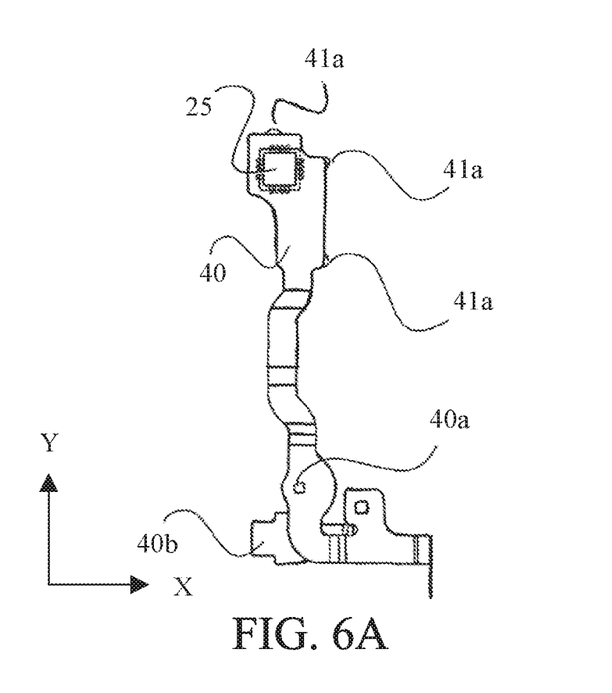
FIGS. 6A and 6B are explanatory views of an angular velocity flexible substrate.
Figure 6B:
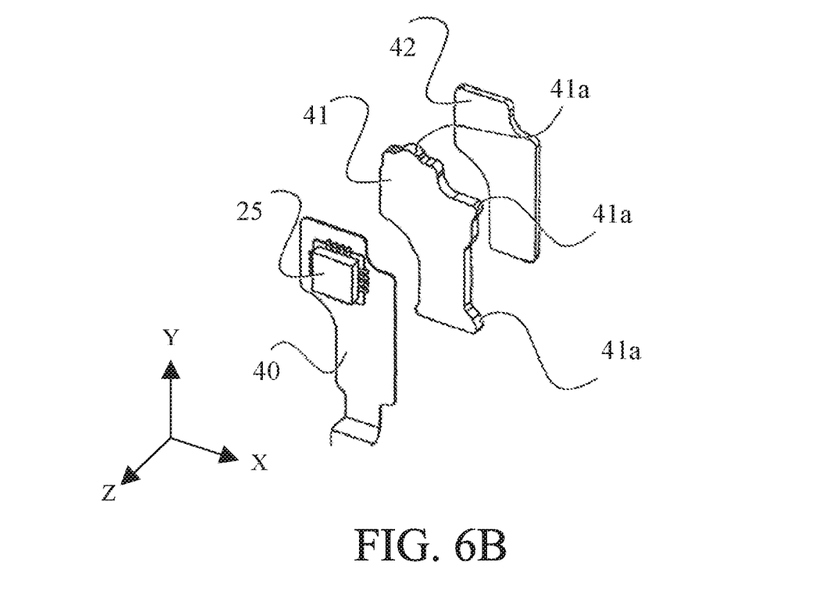
Figure 7:
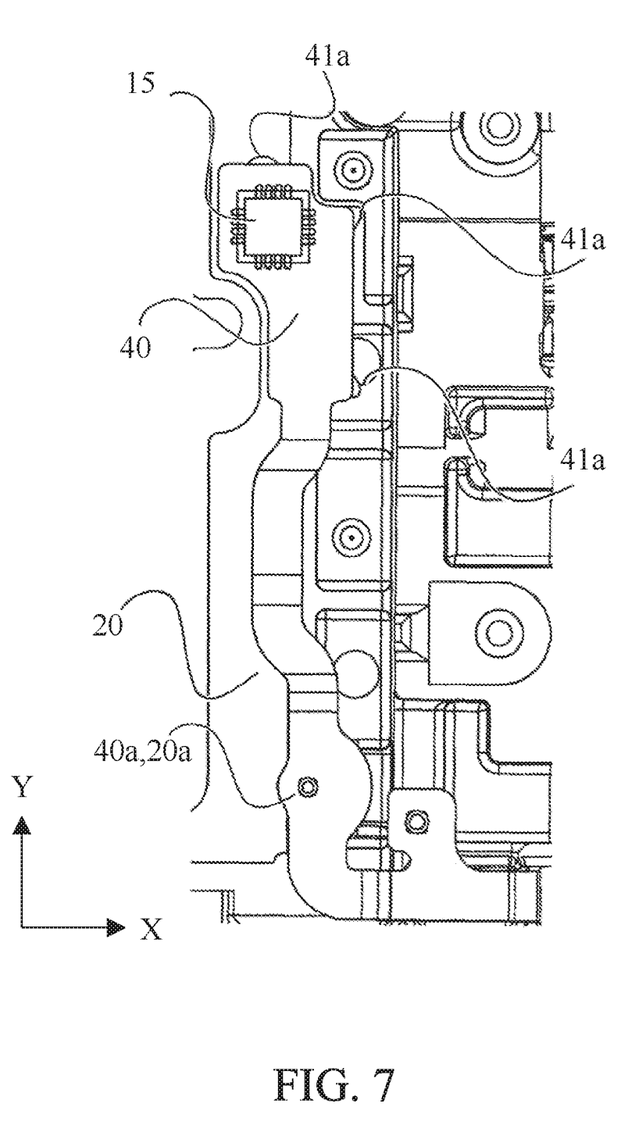
FIG. 7 illustrates the angular velocity flexible substrate attached to a main base.

Referring now to FIGS. 6A. 6B, and 7, a description will be given of a configuration of the angular velocity flexible substrate 40. FIGS. 6A and 6B are explanatory views of the angular velocity flexible printed board 40. FIG. 6A illustrates the angular velocity flexible substrate 40 viewed from the front side (object side), and FIG. 6B is an exploded perspective view of the angular velocity flexible substrate 40. FIG. 7 illustrates the angular velocity flexible substrate 40 attached to the main base 20.

As described above, the angular velocity flexible substrate 40 is mounted with and electrically connected to an angular velocity sensor 15 by solders, and the angular velocity sensor 15 has an exterior made of a resin material. The terminal 40b is connected to an angular velocity connector mounted on the control substrate 24. Thereby, the output signal from the angular velocity sensor 15 is transmitted to the MPU 10 on the control substrate 24.

The angular velocity sensor 15 may cause erroneous detections due to an external force, a deformation of the angular velocity flexible substrate 40, and expansions and contractions of the angular velocity flexible substrate 40 under high or low temperature environments. Accordingly, this embodiment provides a reinforcing member 41 made of a metallic material so as to cover the mounting area of the angular velocity sensor 15 on the back surface of the angular velocity flexible substrate 40. The reinforcing member 41 can reduce the erroneous detection of the angular velocity sensor 15 since the influences of the external force and the deformation of the angular velocity flexible substrate 40 can be prevented.

In image capturing, a vibration occurs in the camera body 1, for example, due to the vibrations of the motor (not illustrated) in the shutter unit 13. This vibration is transmitted to the front unit 30 to which the shutter unit 13 is attached, and the main base 20 to which the front unit 30 is attached. The vibration is also transmitted to the angular velocity flexible substrate 40 fixed onto the main base 20, and causes the erroneous detections of the angular velocity sensor 15. Accordingly, this embodiment provides a buffer member 42 having an air layer and made of a foaming material etc. on a back surface of the reinforcing member 41. The buffer member 42 can relax the vibrations from transmitting to the angular velocity sensor 15 and reduce the erroneous detection of the angular velocity sensor 15.

Since this embodiment mounts the angular velocity sensor 15 on the angular velocity flexible substrate 40, the angular velocity sensor 15 is thermally separated from the control substrate 24. This configuration can restrain the heat from the MPU 10 from negatively influencing the angular velocity sensor 15. The angular velocity sensor 15 is separated from a variety of electric circuits mounted on the control substrate 24, in particular, a circuit that is driven with a frequency near the driving frequency of the angular velocity sensor 15. This configuration can restrain noises, resonances, and vibrations from transmitting to the angular velocity sensor 15.

The angular velocity flexible substrate 40 has a first positioning member 41a and a second positioning member 40a used for positioning when the angular velocity flexible substrate 40 is assembled onto the main base 20.

The reinforcing member 41 includes the first positioning member 41a, as illustrated in FIG. 7, which projects from an outer shape of the angular velocity flexible substrate 40. The angular velocity flexible substrate 40 is positioned by bringing the first positioning member 41a into contact with a target (not illustrated) provided on the main base 20. The target to be positioned is an assembly jig used for the assembly in this embodiment, and the reinforcing member 41 does not contact the main base 20 in the product since the target is detached from the main base 20 after positioning. Since the first positioning member 41a is brought into contact with the target for positioning, the deformation of the angular velocity flexible substrate 40 can be restrained in the assembly and thus the erroneous detection of the angular velocity sensor 15 can be reduced.

The second positioning member 40a has a hole shape formed in the angular velocity flexible substrate 40. As illustrated in FIG. 7, a boss 20a provided to the main base 20 is compressively inserted into the second positioning member 40a. The second positioning member 40a is disposed in an area almost on the same plane as the mounting plane of the angular velocity sensor 15 between the angular velocity sensor 15 and a terminal member 40b, where the reinforcing member 41 or the buffer member 42 is not disposed.

As described above, this embodiment fixes two points of the angular velocity flexible substrate 40 around the angular velocity sensor 15 on a wiring path to the terminal member 40b. This configuration can restrain the buffer member 42 from bending and the angular velocity sensor 15 from positionally shifting due to the tension of the angular velocity flexible substrate 40. As a result, the attachment position of the angular velocity sensor 15 can be stable, and the erroneous detection of the angular velocity sensor 15 can be reduced.

Figure 8A:
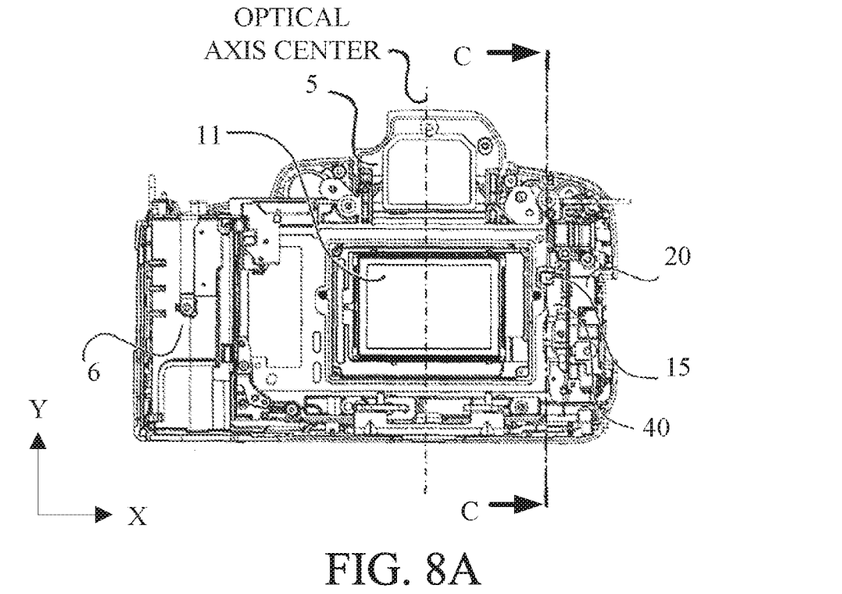
FIGS. 8A and 8B are explanatory views of a disposition of an angular sensor.
Figure 8B:
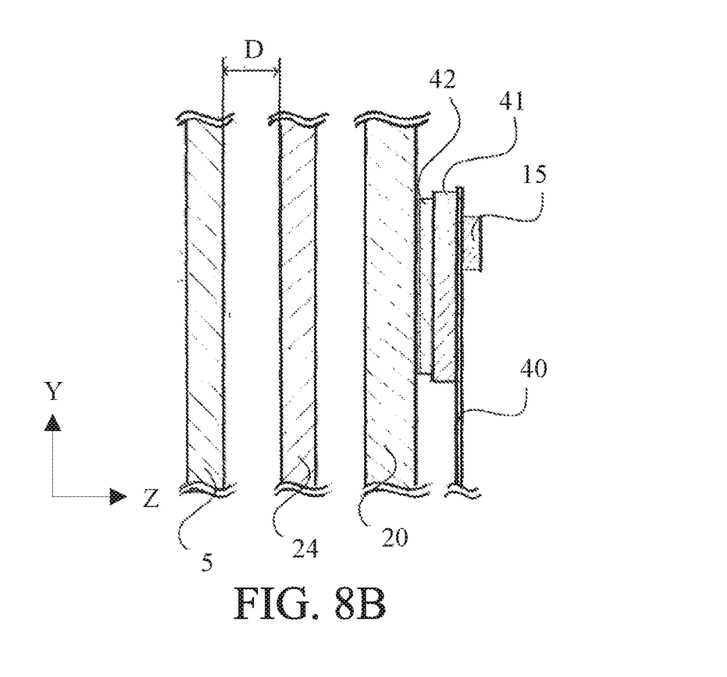

Referring now to FIGS. 8A and 8B, a description will be given of the disposition of the angular velocity sensor 15. FIG. 8A illustrates an internal structure of the camera, body 1 viewed from the photographer side (rear side), and the position of the angular velocity sensor 15 in the internal structure. FIG. 8B is a sectional view taken along a C-C line in FIG. 8A, and illustrates the position of the angular velocity sensor 15 in the optical axis direction.

A description will now be given of the disposition of the angular velocity sensor 15 on the XY plane. As illustrated in FIG. 8A, the angular velocity flexible substrate 40 is attached to the main base 20 so that the angular velocity sensor 15 is disposed on the counter-grip side of the optical axis (optical axis center) when viewed in the optical axis direction and outside a projected area of the image sensor 11. The influence of the temperature change of the grip 6 caused by the temperature of the photographer on the angular velocity sensor 15 can be reduced by arranging the angular velocity sensor 15 on the counter-grip side with respect to the optical axis. The influence of the temperature change on the angular velocity sensor 15 caused by the heat in the MPU 10 can be reduced by separating the angular velocity sensor 15 from the MPU 10 disposed on the grip side. The influence of the temperature change on the angular velocity sensor 15 caused by the heat of the image sensor 11 can be reduced since the angular velocity sensor 15 is disposed on the projected area of the image sensor 11.

Next follows a description of the disposition of the angular velocity sensor 15 in the optical axis direction. As illustrated in FIG. 8B, the angular velocity flexible substrate 40 is attached to the main base 20 so that the angular velocity sensor 15 is disposed on the front side (object side) of a space D formed between the control substrate 24 and the rear exterior cover 5. The angular velocity flexible substrate 40 is disposed parallel to the control substrate 24 so that the buffer member 42 is located on the main base 20 side. As described above, the space D is likely to change the temperature of the camera body 1 due to the heat from the MPU 10 and the opening and closing of the vari-angle unit 100. This embodiment disposes the angular velocity sensor 15 on the front side (object side) of the space D in the optical axis direction, and can reduce the influence of the temperature change of the space D on the angular velocity sensor 15. In addition, the angular velocity sensor 15 is subject to the thermal influence from the control substrate 24 through its approximately parallel plane so as to evenly receive the thermal influence when the temperature of the control substrate 24 rises due to the heat from the MPU 10, and the local temperature rise can be prevented. This configuration can reduce the erroneous detections of the angular velocity sensor 15. Since the buffer member 42 is located on the control substrate 24 side, the air layer in the buffer member 42 can restrain the thermal influence from the control substrate 24 on the angular velocity sensor 15.

Since the angular velocity flexible substrate 40 is attached to the main base 20 different from the front unit 30 to which the drivers are attached that causes vibrations, such as the shutter unit 13 and the mirror unit 14, the angular velocity flexible substrate 40 is less subject to the vibrations.

As described above, the angular velocity sensor 15 according to this embodiment is separated from a vibration source, such as the shutter unit 13, and less subject to the vibration. The angular velocity sensor 15 is separated from the location that is likely to cause the temperature changes in the camera or the space near the grip 6, the near the MPU 10, and the space between the control substrate 24 and the rear external cover 5. This configuration enables the angular velocity sensor 15 to accurately detect the vibration of the camera body 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-088949, filed on Apr. 27, 2017 which is hereby incorporated by reference herein in its entirety.

What is claimed is:

1. An image pickup apparatus configured to detect a vibration comprising:
   a grip configured to project toward an object side in an optical axis direction in an imaging optical system;
   a rear exterior member located on a rear side which is opposite to the object side;
   at least one processor or circuit configured to perform the operations of a display unit;
   the display unit located on the rear side further than the rear exterior member and configured to display an image;
   a hinge mechanism configured to support the display unit rotatably relative to the image pickup apparatus;
   a first substrate located on the object side further than the rear exterior member and including a control element configured to control the image pickup apparatus;
   an angular velocity detector configured to detect an angular velocity of a vibration in the image pickup apparatus;
   a second substrate located on the object side further than the first substrate and having the angular velocity detector; and
   a holder configured to hold the angular velocity detector, on a side opposite to the grip with respect to an optical axis in the imaging optical system viewed from the optical axis direction and on the object side of a space formed between the first substrate and the rear exterior member in the optical axis direction,
   wherein the second substrate includes a buffer member configured to relax a vibration and is held by the holder via the buffer member;
   wherein a reinforcing member made of a metallic material is formed so as to cover a mounting area of the angular velocity detector on a surface of a side of the buffer member of the second substrate,
   wherein the buffer member is formed so as to cover the mounting area of the angular velocity detector on a surface of a side of the reinforcing member of the holder,
   wherein the buffer member, the reinforcing member, and the second substrate are laminated in a three-layer structure in order from a side of the first substrate,
   wherein a first positioning member for positioning the second substrate on the holder is provided in an area of the three-layer structure, and
   wherein a second positioning member for positioning the second substrate on the holder is provided in an area other than the area of the three-layer structure.

2. The image pickup apparatus according to claim 1, further comprising:
   a memory connector connectable with a memory configured to store an image; and a battery configured to supply a power to the image pickup apparatus, wherein the control element, the memory connector, and the battery are arranged on a side on which the grip is provided when viewed from the optical axis direction.

3. The image pickup apparatus according to claim 1, wherein the angular velocity detector is arranged outside a projected area of the image sensor when viewed in the optical axis direction.

4. The image pickup apparatus according to claim 1, wherein the control element sets an imaging condition based on a signal value output from the angular velocity detector.

5. The image pickup apparatus according to claim 4, wherein the imaging condition contains at least an exposure time of the image sensor.

6. The image pickup apparatus according to claim 1, wherein the first positioning member is detached from the holder after the second substrate is assembled to the holder, and wherein even after the second substrate is assembled to the holder, the second substrate and the holder are press-fitted by the second positioning portion.

\* \* \* \* \*